United States Patent [19]

Wong

[11] Patent Number: 4,595,269
[45] Date of Patent: Jun. 17, 1986

[54] CAMERA DOUBLE EXPOSURE PREVENTION SYSTEM

[75] Inventor: Wai C. Wong, Hong Kong, Hong Kong

[73] Assignee: W. Haking Enterprises Limited, Hong Kong

[21] Appl. No.: 659,233

[22] Filed: Oct. 9, 1984

[51] Int. Cl.$^4$ ............................................. G03B 17/42
[52] U.S. Cl. ..................................... 354/204; 354/207
[58] Field of Search ............... 354/204, 205, 206, 207, 354/208, 209, 250

[56] References Cited

U.S. PATENT DOCUMENTS

| | | | |
|---|---|---|---|
| 3,577,900 | 5/1971 | Peterson | 354/207 |
| 3,829,874 | 8/1974 | Morino | 354/204 |
| 4,193,678 | 3/1980 | Son | 354/204 |

FOREIGN PATENT DOCUMENTS

| | | |
|---|---|---|
| 1135150 | 11/1966 | United Kingdom. |
| 1272111 | 7/1968 | Fed. Rep. of Germany. |
| 7014966 | 7/1970 | Fed. Rep. of Germany. |

*Primary Examiner*—A. A. Mathews
*Attorney, Agent, or Firm*—Stephen R. Arnold; Russell E. Hattis

[57] ABSTRACT

A double-exposure prevention system for a still camera having a cockable spring-biased linear movable shutter-actuating slider operable between a cocked condition and held thereat by a latch movably responsive to a manually operated release member and thereafter upon release of the latch to a shutter-actuating position is provided with means for allowing one end of the slider to be rotated out of and away from the axis of the shutter-actuating movement throughout most of the subsequent rewind operation. While in this second angular position, the slider disables the operation of the release member, preventing accidental tripping of the latch after a cocking condition has been restored. During a small terminal portion of the film advance and after the preceding frame has been safely advanced so as to be out of the way, the film advance mechanism then rotates the slider back to its initial position. In the preferred form of the invention, these features are accomplished by modifying the location and configuration of a conventional non-safetied shutter release system. No additional parts are necessary.

11 Claims, 20 Drawing Figures

CAMERA DOUBLE EXPOSURE PREVENTION SYSTEM

TECHNICAL FIELD OF THE INVENTION

The technical field of the invention is the still camera art, and in particular double exposure prevention systems for preventing shutter actuation before the next film frame has been fully advanced.

BACKGROUND OF THE INVENTION

One common still camera shutter construction with which the present invention is concerned utilizes a pivoted shutter member which is spring urged into a position where it covers the camera lens aperture. A shutter actuation member is movable between a released position to which it is urged by spring, and a cocked position where it is held by a latch until a shutter actuation release button is depressed by the user to take a picture. As the shutter actuator is thereby released, it strikes and moves by a projecting portion of the shutter member which swings back and forth to momentarily uncover the lens aperture.

The shutter actuator is then cocked by movement of a film advancing thumb wheel or lever which rotates a member which performs both a shutter actuator cocking and one-frame film advancing operation. Usually, the cocking operation occurs during the initial portion of the film advancing operation. A variety of means have been provided to prevent accidental tripping of the shutter actuator before the film is fully advanced. This serves to prevent accidental double exposure of a portion of the previously exposed film frame.

The necessity for this feature arises from certain mechanical constraints which generally require that the shutter actuator release mechanism be restored to a cocked position substantially before the termination of the film advancing process. This is necessary to achieve proper synchronization of the two processes. In inexpensive cameras the flip-open shutter described is probably the most commonly employed shutter type. The shutter release system for such a shutter frequently consists of a linearly operable slider spring-urged to a released position as described. The film advancing mechanism is coupled to force the slider during film advance against the biasing action of the spring involved to a point where it is engaged by the latch. Upon depression of the shutter actuator release button, a coupled motion therefrom trips the latch to a disengaging position, whereupon the slider is rapidly actuated by this spring in a linear direction to an opposite extreme position thereof, during the course of which travel a striker attached to the slider impacts upon some portion of the shutter as described.

Because of the above-mentioned constraints, it is found necessary to provide a measure of substantial further film advance after shutter actuator slide cocking is complete, during which interval the slider is vulnerable to premature tripping. Although a great many systems have been devised to prevent this premature shutter tripping, such prior art systems of which the applicant is aware generally require the addition of extra components to the camera, thereby adding to camera cost. It would be a useful feature if such a simple reciprocating slide system could be modified at little or no cost to provide such a feature.

SUMMARY OF THE INVENTION

According to a broad feature of the invention, the spring-biased linear shutter-actuating cockable slider described above is pivotally as well as slidably mounted to allow the slider to have two different orientations in its fully cocked position. In particular, the slider is preferably spring urged into a first shutter actuator release-blocking orientation, at least when the slider latch first engages the slider to hold the same in a fully cocked condition. This orientation may be one where it is at an angle relative to the linear axis of movement thereof. While in this angularly displaced orientation, the latch release mechanism is disabled, and premature tripping of the shutter is prevented. The slider remains in this latch release-disabling position until the previously exposed film frame has been advanced sufficiently far that it is out of the field of exposure of the lens. Finally, during an extremely small terminal portion of the film advancing operation, the slider is returned to an initial orientation, preferably against the spring force which provides the previous orientation, where the latch releasing system is in an operative condition. The slider is most advantageously moved into its various positions and orientations by an eccentric-pin shutter cocking drive means coupled to the film advancing system. The eccentric pin first engages a portion of the slider to cock the same and then leaves contact with the same until it engages another portion of the slider to pivot the same into its non-blocking orientation when a one-frame film advancement is completed.

According to a related specific preferred feature of the invention, one end of the slider is provided with slider-guiding pivoting support means allowing the slider to be moved linearly therealong, and also rotatably thereabout. The other end of the slider is allowed to move to a limited degree in a transverse direction to the axis of the slider release motion, thereby allowing the slider to be rotated a relatively modest angle. In the preferred form of the invention these motions are accomplished simply by providing a pair of linear pin-and-slide slot guides, the slot at one end of the slider having a substantial transverse width as compared to the diameter of the guide pin extending therethrough. The slide biasing spring is positioned to urge the slider after slide release away from an initial orientation and toward the second release-disabling orientation. A spring-loaded depressible shutter actuator release button carried on a bar member, is configured with an integral extension which confines the slider to its initial non-blocking orientation during the release stroke. Release of the pressure on the button after slide release causes it to return to its original position and lift the extension out of confining engagement with the the slider. This frees the slider for rotation, and the slider spring urges it to its angular, blocking orientation. In this second angular orientation the slider confronts the same extension of the bar member which previously confined it, thus preventing depression of the bar member until the slider has been restored to its initial angular orientation.

By the foregoing preferred means, a conventional slider system is effectively provided with a double-exposure prevention feature simply by modifying the slider guide means to allow a limited rotation of the slider about one end, providing a modified release bar member having an extension captively preventing angular displacement of the slider during shutter release, disposing the slide spring to rotate the slide thereafter to an extension-blocking position, and configuring a portion of the slider to engage a portion of the film advance mechanism to restore the slider once again to its initial cocked position after the film has been adequately advanced. Thus, by simple reconfiguration and relocation of existing elements long known in the art, double exposure prevention is provided at little or no cost.

The above and other features and advantages of the invention will become apparent upon making reference to the specification and claims to follow and the drawings.

DETAILED DESCRIPTION OF THE INVENTION

The present invention is concerned with systems for preventing shutter actuation in still cameras before the next film frame has been fully advanced after a previous exposure, and in particular describes a novel modification of a conventional prior art film advance and shutter cocking system to provide such a safety feature without adding new parts to the system. Existing parts are merely reconfigured or relocated.

In general, it may be stated with respect to most still cameras having shutter actuator cocking mechanisms which are coupled to the film advance mechanism to be cocked during an intermediate portion of film advance, that, because of certain basic mechanical constraints, the shutter actuator will become cocked substantially before the film has been fully advanced. It is in this latter terminal phase that the system must be protected against accidental tripping of the shutter. Although a wide variety of such systems are known in the art, to the applicant's knowledge all such safety systems require the addition of extra components to an otherwise simple system, thereby adding to camera complexity. The present system completely overcomes such a limitation.

Figure 1:
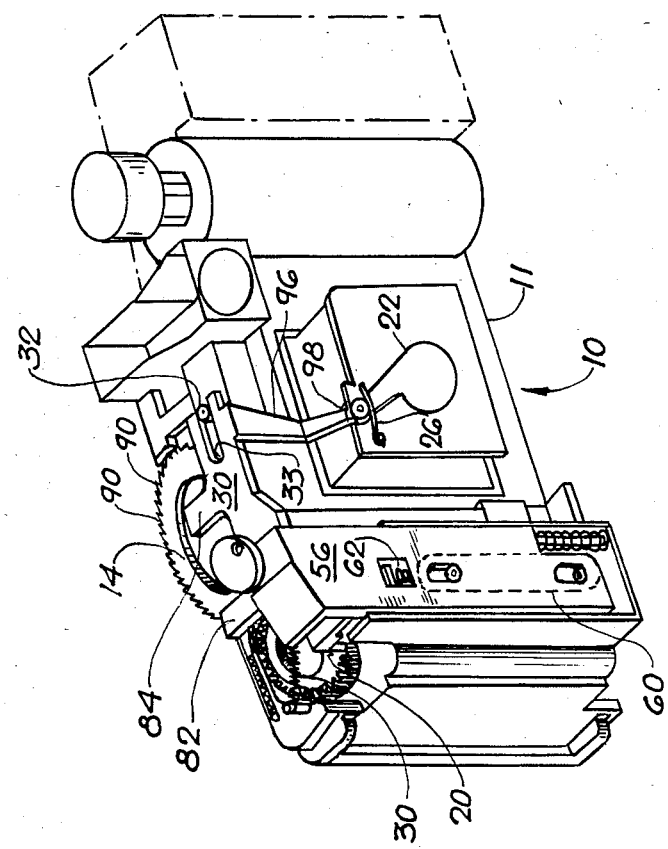
FIG. 1 is a perspective view of elements of a conventional 35 mm still camera, showing in particular a manual film advancing wheel, a take-up spool drive gear, a flip-type shutter, a reciprocatingly movable slider, and a slider release mechanism.
Figure 2A:
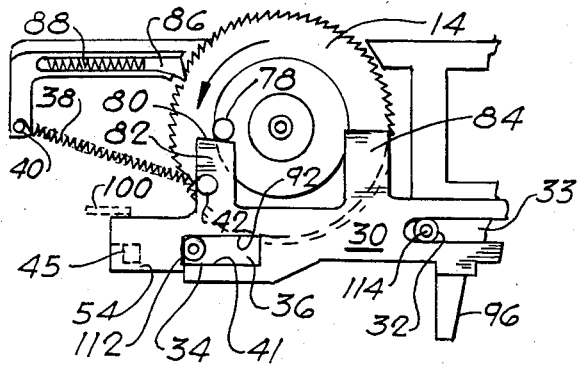
FIG. 2A is a plan view of the principal elements of the shutter-actuating slider and film advance system in a cocked position at the end of film advance.
Figure 2B:
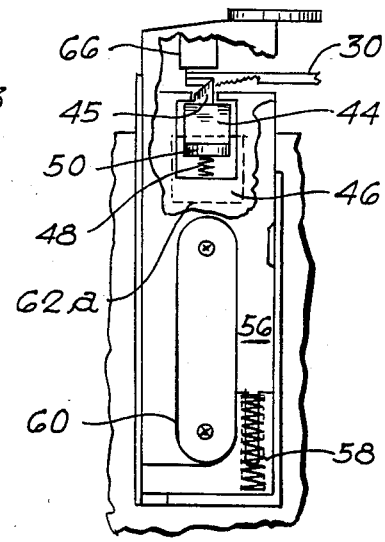
FIG. 2B is a partial cut-away front view of the slider release mechanism of FIG. 2A showing a spring urged slide-engaging latch member element captively restraining the slide in the cocked position.
Figure 2C:
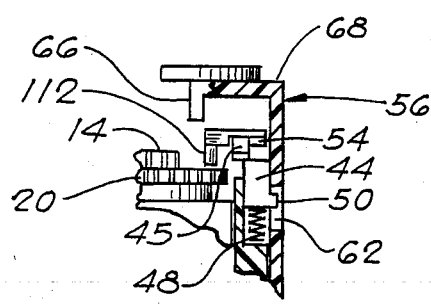
FIG. 2C is a partial cut-away side view of the upper portion of FIG. 2B showing further details of the latch member and further showing details of a lost-motion coupling thereof to a release bar.

FIG. 1 shows the principal operative elements of the present system as applied to a conventional still camera 10, those elements of the camera which are not central to the disclosure of the present invention being indicated either in simple outline or in functional form. Thus, a film roll (not shown) located in a dispensing compartment 12 is advanced by manual rotation of a film advance wheel 14 coupled to rotate a conventional film engaging toothed sprocket (not shown), and also driving a take-up spool drive gear 20 via intermediate gearing (not shown) and typically through an associated friction clutch (not shown). Also shown is a shutter blade 22 rotatably supported about a shutter pivot 24 and rotatingly biased to a clockwise lens-covering position by a shutter spring 26. Further details of the principal elements of this system in the cocked or initial state, with the film fully advanced and ready for exposure are best shown in FIGS. 2A, 2B and 2C. In all future discussions the terms right, left, clockwise, and counterclockwise, will be taken to refer to mechanism motions as viewed in FIG. 2A. Similarly, the terms up, down, above and below will refer to orientations displayed in FIGS. 2B and 2C.

A generally bar-shaped slider 30 is mounted on an upper surface of the camera housing and is configured for general left-to-right reciprocating motion, the slider being guided in this motion at its right end by a guide pin 32 fixed to the camera housing 11 and engaging a generally elongated and reasonably closely-fitting guide slot 33. Similarly, proximate to the left end of the slider 30 a similarly mounted guide pin 34 captures the opposite end of the slider 30 by means of a generally elongated guide aperture 36, similarly elongated in the lengthwise direction of the slider, but further being additionally elongated in the transverse direction as well, to allow the slider 30 to be rotated a modest degree clockwise or counterclockwise about the guide pin 32, for reasons that will shortly become apparent. A generally planar retaining plate (not shown) attached by screws engaging threaded holes 114 and 116 in the guide pins 32 and 34 and in other portions of the camera housing 11 loosely confronts the upper surface of the slider 30 to captively retain the slider 30 while still allowing the free motion thereof throughout all phases of the camera operation cycle.

The slider 30 is urged to the left by a slider spring 38 (resilient biasing means) captively secured at one end to a spring post 40 mounted on the camera housing 10, and at the other end to a spring post 42 mounted on an intermediate portion of this slider 30. It will further be noted that, with the slider 30 in the cocked position as shown in FIGS. 2A–2C, the axis of the slider spring 38 passes between the guide pins 34 and 32; hence, not only does the slider spring 38 urge the slider to actuate the shutter blade 22 upon release from the position shown, but also this spring serves to impart a torque to the slider 30 about the guide pin 32. It will subsequently be evident that throughout the various positions of the slider 30, the slider spring 38 will always produce a force tending to rotate the slider clockwise to place the forward wall 41 of the guide aperture 36 against the guide pin 34. FIGS. 8A–8D show various views of the slider 30.

The slider 30 is captively secured by latching means in the cocked state with the slider spring 38 substantially extended, the latching means including a latch member 44 slidably mounted for vertical movement in a recess 46 in the camera housing 11. The latch member is urged upward by a biasing spring 48 compressingly engaging the lower surface of an outwardly extending foot portion 50 configured to extend forward away from the camera housing 11. A vertically extending portion 45 of the latch member 44 is configured with a latch face disposed to confrontingly face a vertically oriented face 54 formed at the left end of the slider 30 to restrainingly engage the slider 30 against the force of the spring.

Also mounted on the camera housing 11 (FIGS. 2B and 2C) is a release bar 56 (release member) slidably held in position by a retaining plate 60 and mounted so as to be movable in a vertical direction over a limited range, the bar being urged upward by a release bar spring 58 to the dormant position shown in FIGS. 2B and 2C. The release bar is provided with a rearwardly extending bridge portion 68 and a downwardly facing extension 66 at the rear thereof. A dotted rectangle 100 (FIG. 2C) shows the location of the extension 66 with respect to the slider 30. A rectangular aperture 62 in the major front face of the release bar 56 is positioned to acceptingly pass the forwardly extending foot 50 of the latch member 44. In FIG. 2B and all subsequent views related thereto, the location of aperture 62 is denoted by the dotted boundary 62a. As will subsequently become apparent, the purpose of the extended aperture 62 is to provide for a lost-motion feature during shutter actuation.

Finally, it will be noted that in the cocked position of the system an upwardly extending eccentric pin 78 mounted towards the periphery of the film advance wheel 14 pressingly engages the rear surface 80 of a rearwardly extending extension 82 of the slider 30. The film advance wheel 14 is held in this position at the end of film advance by a ratchet mechanism consisting of a ratchet pawl 86 urged by a spring 88 into engagement with peripheral serrations 90 on the edge of the film advance wheel. Thus, during film advance the film advance wheel can be rotated in one direction only, and at the termination of film advance and cocking the eccentric pin 78 presses against the slider extension 82 to urge the slider to its extreme counterclockwise position shown in FIG. 2A, such that the rear wall 92 of the enlarged guide aperture 30 presses against the left guide pin 34.

Figure 2E:
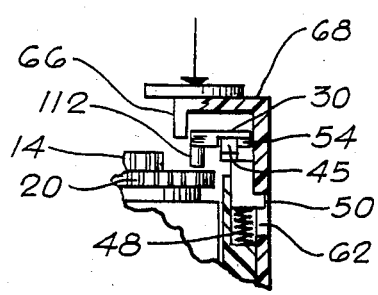
FIGS. 2D and 2E correspond to FIGS. 2C and 2B respectively, wherein the release bar has been partially depressed and is beginning to engage the release member to trip the slider into a released condition.
Figure 2D:
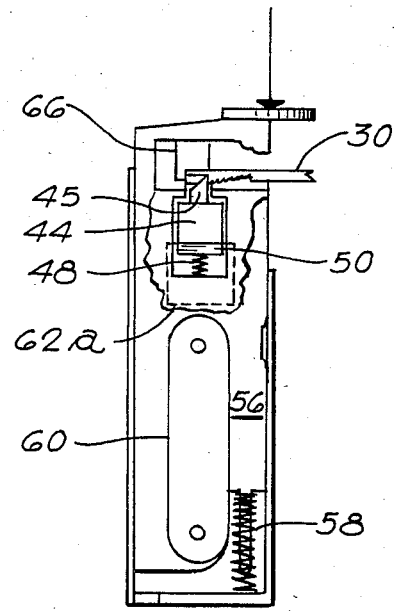

During the first phase of shutter release (FIGS. 2D and 2E) a downward pressure applied to the release bar 56, most preferably applied at the bridge 68 thereof, forces the release bar downward to the point where the upper wall 64 of the aperture 62 in the front face of the release bar begins to bear against the upper surface of the outwardly extending foot 50. In FIG. 2E it will be seen that with the release bar 56 thus partially depressed, and before the latch member 44 has been moved, the release bar extension 66 is now sufficiently depressed that the rear interior face thereof now closely confronts the rear face of the left end of the slider 30.

Figure 2G:
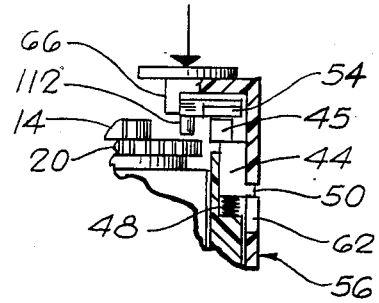
FIGS. 2G and 2F are similarly corresponding views showing the release bar fully depressed and the latch member disengaged, slider travel not yet having begun.
Figure 2F:
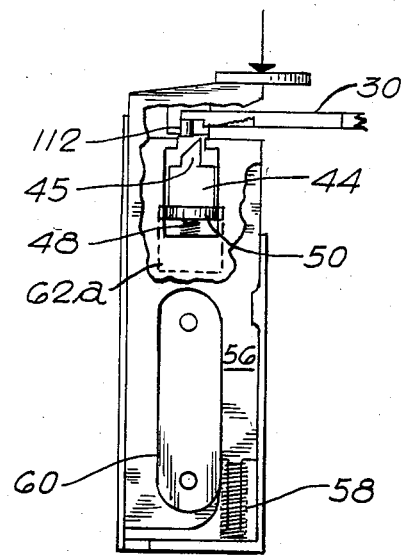
Figure 3:
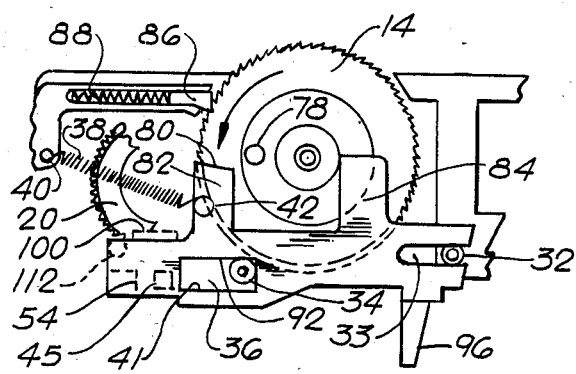
FIG. 3 is a view of the elements shown in FIG. 2A after the slide has been released to be urged to the left, actuating a shutter exposure cycle.

The second phase of shutter release is shown in FIGS. 2F and 2G, wherein the release bar 56 has been further depressed so that the latch member 44 has been withdrawn from engagement with the slider latching face 54. At this point the slider is free to move to the left as shown in FIG. 3. During this movement a shutter striker 96, preferably integral with the slider 30 and depending forwardly therefrom strikes a shutter blade extension 98 to cause the shutter blade 22 (FIG. 1)to execute a conventional shutter flip-open operation. It will be noted that because of the movement of the slider to the left, the extension 82 no longer is in contact with the eccentric pin 78 on the film advance wheel 14. Nevertheless, clockwise rotation of the slider during this operation is inhibited because the left end of the slider is slidingly captively secured under the bridge 68. It will further be noted that the rear surface 80 of the extension 82 is configured with a slight sloping angle so that the previously mentioned pressure from the eccentric pin 78 prior to disengagement of the latch member 44 cannot frictionally hinder the leftward movement of the slider 30. A portion of the cassette drive gear 20 is also shown.

Figure 4A:
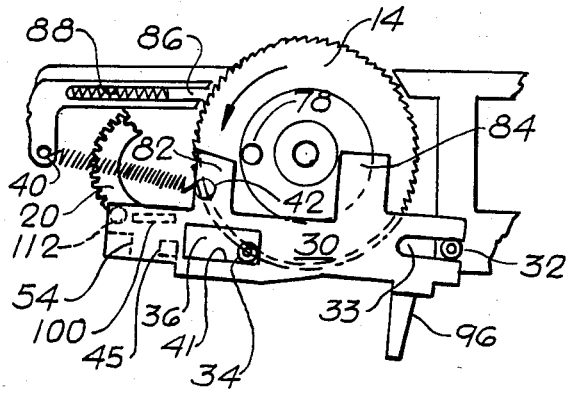
FIG. 4A shows the arrangement of the elements of FIG. 3 after release and return of the release bar to its initial position shown in FIG. 2B, further showing the rotation of the slider to an angularly offset position. A fragmentary portion of the take-up spool drive gear shown in FIG. 1 has been added to show the position of the left end of the slider with respect to the top surface of said gear.
Figure 4B:
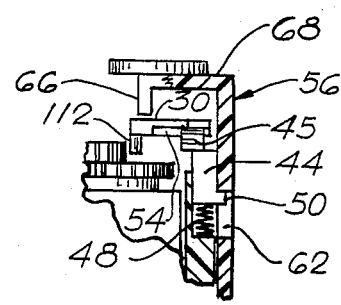
FIG. 4B is a view similar to FIG. 2C, but showing the end portion of the slider rotated into a confronting position with a downwardly-facing extension of the release bar.

Referring next to FIGS. 4A and 4B, it will be noted that upon release of downward pressure on the release bar 56, the bar is urged upward by its associated spring 58, whereupon the slider 30 is no longer captively secured against rotation by the release bar extension 66, the slider extension 82 also having moved out of engagement with the eccentric pin 78, and therefore the slider 30 is immediatley urged into clockwise rotation under the influence of the slider spring 38. This rotation occurs until the forward wall 41 of the guide aperture 36 contacts the forward left-hand guide pin 34. As shown in FIGS. 4A and 4B and in particular by the dotted boundary 100, indicating the periphery of the lower face 72 of the release bar extension 66, a portion of the slider 30 now blocks the release bar against any substantial depression thereof, and thus prevents any actuation of the latch member 44 thereby. A pin 112 depending downward from the end of the slider 30 closely confronts the upper surface of the takeup spool drive gear 20. Any downward flexure of the end of the slider 30 induced by the pressure of the extension 66 will thus be immediately arrested.

Figure 5:
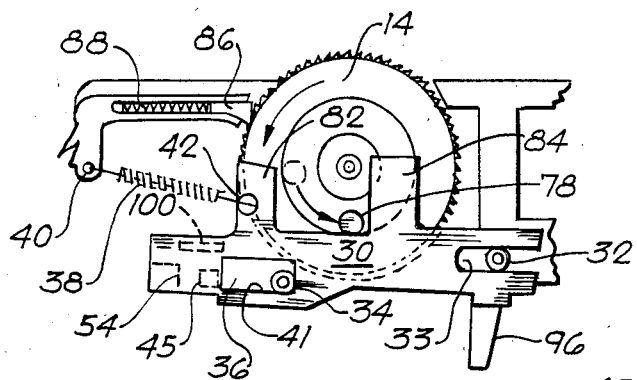
FIG. 5 illustrates the position of the principal elements of FIG. 4A after a rotation of the film advancing wheel of approximately 90°.
Figure 6B:
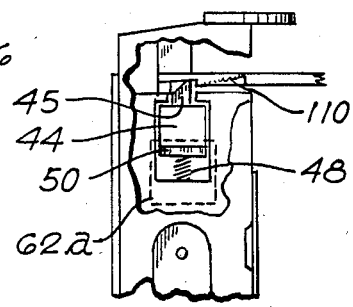
FIG. 6B is a view similar to FIG. 2B illustrating an over-cocked condition of the slide with respect to the latch member during the advancing phase shown in FIG. 6A.
Figure 6A:
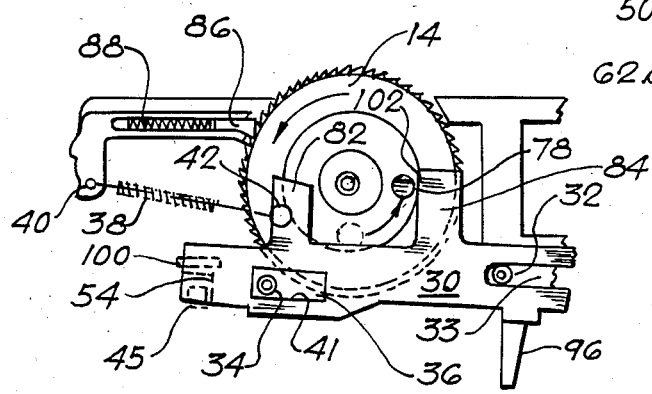
FIG. 6A shows the relative location of the elements shown in FIG. 5 after a further 90° rotation of the film advancing wheel.

Referring next to FIG. 5, to prepare the camera 10 for the next exposure, the film advance wheel 14 is manually rotated counterclockwise. During approximately the first 90 degrees of this rotation little, if any, motion is imparted to the slider 30, the film transport mechanism during this period advancing the film approximately one-quarter of a frame. The terminal phase of this first portion of the film advance is shown in FIG. 5. During a subsequent rotation of approximately an additional 90 degrees (FIGS. 6A and 6B), the eccentric pin 78 on the film advance wheel 14 comes into engagement with the left margin 102 of the right rearward extension 84 of the slider 30. The slider 30 is thus urged during this phase to the right against the force of the spring 38, the slider being driven to an "overcocked" condition as shown in FIG. 6B wherein the latch member 45 is urged upward by its spring 48 to confront the slide latching face 54 but separated a small lateral distance therefrom. A ramp surface 110 initially urges the latch member 44 downward against the force of the spring 48 during the initial portion of this phase. It will be noted from the dotted outlines in FIG. 6A that the slider latching face 54 is configured with a sufficient length in a front-to-rear direction, i.e. transversely to the long axis of the slider 30, that the latch face of the latch member 45 will confront the slide latching face 54 in either angular orientation of the slider 30.

It will further be noted that the regions of contact of the eccentric pin 78 against the extension wall 102 are always to the rear of the axis defined by the guide pins 32 and 34, as a result of which the pressure brought against the slider 30 does not provide a counteracting torque against the action of the slider spring 38. As a result of this, the slider 30 remains in its clockwise rotated condition throughout this phase of film advance also. The film has now been advanced approximately one-half of a frame.

During the next approximately 170 degrees or so of rotation of the film advance wheel 14 (FIG. 7B), the eccentric pin 78 disengages from the extension 84, thereby allowing at an early point in this phase the slider 30 to move slightly towards, and be interceptingly latched by, the engagement of the latch face of the latch member 45 against the slide latching face 54 of the slider as shown.

Figure 7A:
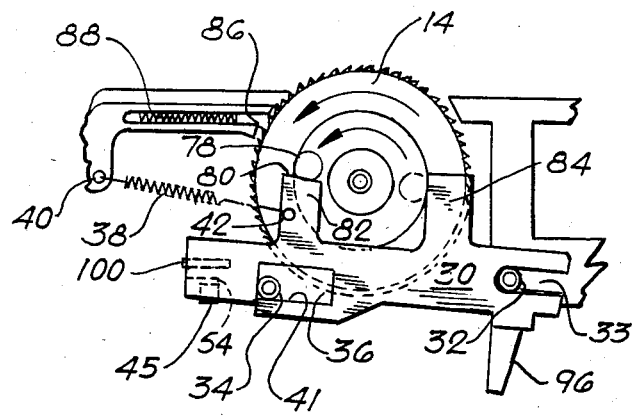
FIG. 7A shows the elements of FIG. 6A after an additional nearly complete half-rotation of the film advancing wheel, showing the eccentric drive pin beginning to contact a shoulder extension of the slider.
Figure 7B:
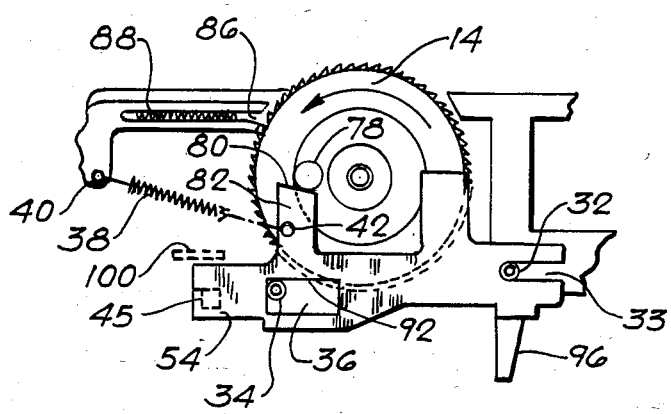
FIG. 7B shows the arrangement of the elements of FIG. 7A at the end of the film advancing operation, the slider now being returned to the original angular orientation.
Figure 8A:
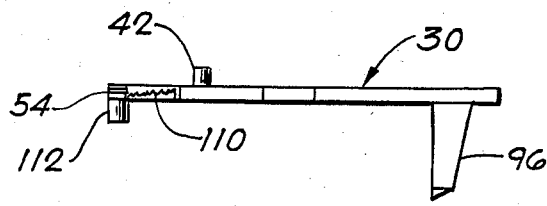
FIG. 8A is a front elevational view of the slider.
Figure 8D:
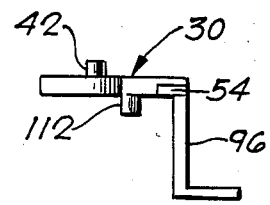
FIG. 8D is a left-hand side elevational view of the slider of FIG. 8A.
Figures 8B, 8C:
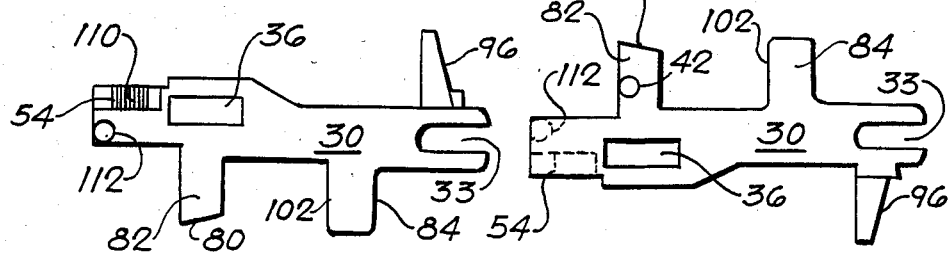
FIG. 8B is a bottom view of the slider of FIG. 8A.
FIG. 8C is a plane view of the slider shown in FIG. 8A.

FIG. 7A shows the eccentric pin 78 just coming to bear against the rear surface 80 of the left extension 82 of the slider 30 at the end of this phase. It is during this 170 degree phase of film advance that the camera is vulnerable to double exposure, since the slider 30 is now held in a cocked position by the latch member 45. Unless measures are taken to insure that under accidentally applied manual pressure to the release bar 56 the latch member 45 cannot come out of engagement with the slide latching face 54 during this last half of the film advancing operation, a double exposure will result on a portion of the previously exposed frame. It will be noted that, since the slider remains in its clockwise rotated state, the lower face of the release bar extension 6 is still immediately confronted by a portion of the upper surface of the slider 30. As a result, the release bar 56 cannot be depressed sufficiently to engagingly trip the latch member 44, thus providing the desired safety feature.

Finally, during a very small terminal phase of the rotation of film advance (FIG. 7B) wheel 54 the eccentric pin 78 bears against the rear surface 80 of the extension 82, rotating the slider in a counterclockwise direction to restore it to the initial condition previously described with respect to FIGS. 2A-2C. By insuring that the amount of rotation of the film advance wheel 14 necessary to secure this terminal counterclockwise rotation is sufficiently small with respect to the film advancing rate provided by the intermediate gearing 16, the present system insures that the previously exposed frame has been sufficiently advanced that even should accidental tripping occur during this slight terminal portion of film advance, no double exposure of the previously exposed frame will occur.

A readily sensed stiffness attendant to this final counterclockwise rotation of the slider 30 arises when the left guide pin 34 engagingly encounters the rear wall 92 of the large guide aperture 36, and serves to warn the operator that the film advance phase has terminated. It will be evident to those of oridinary skill in the art that a variety of tension sensors could alternatively be used in conjunction with motor drive systems to accomplish the foregoing operations by completely automatic means.

With respect to prior art shutter release systems, those of ordinary skill in the art will recognize that the mechanism described herein is closely related to a conventional non-safetied shutter release system. Thus, referring to FIGS. 2A-2C, if one were to remove the left slider extension 82, the release bar extension 66, and the lost motion feature provided by the elongated aperture 62 in the release bar 56, and further modify the guide aperture 36 to be a tightly confining slot similar to the right-hand guide slot 33, one would have a conventional prior art shutter release system. The present mechanism, on the other hand, achieves double exposure prevention simply by modifying structural elements known in the prior art, and does not require the addition of a single new element to the system. Thus, a highly useful feature is provided at a minimum of expense.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out the invention, but that the invention will include all embodiments and equivalents falling within the scope of the general principles disclosed herein.

I claim:

1. In a still camera having a shutter actuating means and film advancing means for advancing a filmstrip, said shutter actuating means including a slider member movable bodily in two opposite linear directions aligned along a given axis between a first or released and a fully cocked position, resilient biasing means for urging said slider member to said released position to operate the camera shutter, latching means responsive to movement of said slider member to a fully cocked position for captively retaining said slider member in such position against the return force of said biasing means, latch release means coupled to said latching means and responsive to an applied pressure for releasingly disengaging said latching means from said slider member to allow movement thereof to said released position, said film advancing means being coupled to said slider member to move said slider member from said released to said fully cocked position to be captured by said latching means before the next film frame has been fully advanced, the film advancing means then reaching the final position where film advancement is complete, the improvement comprising:

pivot-forming means for supporting said slider member for movement between a first latch release blocking and a second non-blocking orientation thereof where said latch release means is respectively inoperative and operative to release said latching means, said blocking orientation being maintained at least from the time the slider member is in said fully cocked position and until the preceding film frame has been fully advanced, said latching means retaining said slider member in a cocked position when said slide member has both of said orientations, and means responsive to the movement of said film advancing means into said final position to pivot said slide member from said blocking to said non-blocking orientation.

2. The still camera of claim 1 wherein said resilient biasing means urges said slide member into said blocking orientation after release of said slider member by said latching means.

3. The still camera of claim 1 wherein said latch release means includes a depressible member spring-urged to an extended position and when depressed releasing said latching means, and said slider member underlies said depressible member in said blocking orientation to prevent depression thereof until said film advancing means is moved into said final position.

4. The camera of claim 1 wherein said film advancing means includes a rotating member normally rotatable only in one direction and making a lost motion coupling to said slider member for first momentarily engaging said slider member to fully cock the same.

5. The camera of claim 4 wherein said film advancing means again engages said slider member when moved to said final position.

6. The still camera of claim 4 wherein said rotating member has an eccentric pin and said slider member has wall portions momentarily engageable by the pin to move the slider member to fully cock the same, the pin then moving away from engagement with said slider and subsequently reengaging the slider member to pivot the same into said second, non-blocking orientation when film advance has been completed 7. The camera of claim 3 wherein said release member is configured to slidingly confine said slider member in said non-blocking angular position when said slider member is cocked in said non-blocking position and said release member is operated from said dormant to said latch-releasing position.

8. The camera of claim 1 wherein said pivot-forming means includes pin-and-groove guide means at one end portion of said slider for allowing linear movement of said slider member therealong and rotation thereabout.

9. The still camera of claim 1 wherein said pivot-forming means pivotally supports one end portion of said slide member for pivotal movement and where the other end portion thereof is movable to a position spaced substantially from said given axis so as to provide said slide member with an orientation position at or close to said given axis and to provide said slide member with a displaced orientation at an angle thereto, said resilient biasing means urging said slide member into said displaced orientation.

10. The camera of claim 4 wherein said pivot-forming means includes first pin-and-groove guide means at one end portion of said slider member for allowing linear movement of said slider member therealong and rotation thereabout and second pin-and-groove guide means at the other end portion of said slider having a transversely enlarged groove to permit rotation of said slider member about said first pin-and-groove guide means and between said first blocking and second non-blocking orientations, said latch release means includes a depressible member spring-urged to an extended position and when fully depressed releasing said latching means, and said slider member underlies said depressible member in said blocking orientation to prevent depression thereof until said film advancing means is moved into said final position, and when partially depressed before slide release said depressible member captively confines said slider to said non-blocking orientation, said rotating member includes an eccentric pin momentarily engaging during an initial portion of film advance said slider member to return said slider member to a cocked condition while in said blocking orientation and disengaging therefrom during the remainder of film advance until the film is safely advanced beyond possible double-exposure.

11. The camera of claim 10 wherein after said film is safely advanced said eccentric pin again engages said slider member to rotate said slider member to said non-blocking orientation, and said resilient biasing means is a spring member disposed to urge said slider member toward said released position and toward said blocking orientation, so that the return of said depressible member after slider member release frees said slider member to be urged to said blocking orientation.

* * * * *